United States Patent
Roosli et al.

(10) Patent No.: US 10,181,708 B2
(45) Date of Patent: Jan. 15, 2019

(54) CONTROL ASSEMBLY

(71) Applicant: Honeywell International Inc., Morristown, NJ (US)

(72) Inventors: Philipp Roosli, Niantic, CT (US); Ryan Gardner, Niantic, CT (US); Ravi Sagar, East Lyme, CT (US)

(73) Assignee: Honeywell International Inc., Morris Plains, NJ (US)

( * ) Notice: Subject to any disclaimer, the term of this patent is extended or adjusted under 35 U.S.C. 154(b) by 936 days.

(21) Appl. No.: 13/735,826

(22) Filed: Jan. 7, 2013

(65) Prior Publication Data

US 2014/0190679 A1 Jul. 10, 2014

(51) Int. Cl.
*F24F 11/00* (2018.01)
*B23P 19/00* (2006.01)
(Continued)

(52) U.S. Cl.
CPC .............. *H02G 3/08* (2013.01); *F24F 13/20* (2013.01); *F24F 2013/207* (2013.01); *Y10T 29/49826* (2015.01)

(58) Field of Classification Search
CPC ...... F24F 13/20; F24F 2013/207; H02G 3/08; Y10T 29/49826
(Continued)

(56) References Cited

U.S. PATENT DOCUMENTS 4,284,126 A * 8/1981 Dawson ............ G05D 23/1917
165/11.1
5,428,964 A * 7/1995 Lobdell ................ F24F 11/0009
236/44 C
(Continued)

FOREIGN PATENT DOCUMENTS

CN 101526255 9/2009
CN 201897291 7/2011
(Continued)

OTHER PUBLICATIONS

Off_DefinitionMerriamWebster; URL https://www.merriam-webster.com/dictionary/off, entry: adjective, accessed Jan. 10, 2018.*
(Continued)

*Primary Examiner* — Gregory Huson
*Assistant Examiner* — Elizabeth M May
(74) *Attorney, Agent, or Firm* — Seager, Tufte & Wickhem LLP

(57) ABSTRACT

A control component for insertion in a standard size connection box of a conventional component such as a switch or other electrical mechanism. The control component may have new capabilities plus maintain the capabilities of the conventional component. The connection box need not be removed, or if the box is removed then the structure or space encompassing the box need not be enlarged. Further, no new wiring for is necessarily needed for connecting the control component. This placement or substitution may be particularly applicable to many rooms of hotels, motels, and other facilities. Neither time nor expense of modifications to the connection box, wiring and/or the room is necessarily needed. In many cases, a room or space cannot necessarily be modified to add a larger or an additional component having additional capabilities, such as a component having an air quality controlled device for operating a ventilation fan in a room.

13 Claims, 8 Drawing Sheets

(51) Int. Cl.
*H02G 3/08* (2006.01)
*F24F 13/20* (2006.01)

(58) Field of Classification Search
USPC .......................................... 165/237; 29/428
See application file for complete search history.

(56) References Cited

U.S. PATENT DOCUMENTS

| | | | | |
|---|---|---|---|---|
| 5,819,840 | A * | 10/1998 | Wilson | G05D 23/1902 |
| | | | | 165/11.1 |
| 6,236,303 | B1 | 5/2001 | Wagner et al. | |
| 7,053,757 | B2 | 5/2006 | Buckingham et al. | |
| 7,455,583 | B2 * | 11/2008 | Taya | F24F 7/06 |
| | | | | 454/229 |
| 7,576,647 | B1 * | 8/2009 | Mudge | H05B 37/0227 |
| | | | | 340/541 |
| 7,632,178 | B2 * | 12/2009 | Meneely, Jr. | F24F 11/0017 |
| | | | | 454/237 |
| 2009/0005917 | A1 * | 1/2009 | Hole | G08B 21/14 |
| | | | | 701/3 |
| 2009/0143916 | A1 * | 6/2009 | Boll | F24F 11/0086 |
| | | | | 700/276 |
| 2010/0201531 | A1 * | 8/2010 | Pakravan | G08B 29/20 |
| | | | | 340/632 |
| 2010/0236824 | A1 * | 9/2010 | Roosli | H05K 5/0017 |
| | | | | 174/503 |

FOREIGN PATENT DOCUMENTS

| | | |
|---|---|---|
| CN | 201916230 | 8/2011 |
| CN | 202145038 | 2/2012 |
| EP | 2458570 | 5/2012 |

OTHER PUBLICATIONS

On_DefinitionMerriamWebster, URL https://www.merriam-webster.com/dictionary/on, entry: adjective, accessed Jan. 10, 2018.*
U.S. Appl. No. 13/603,328, filed Sep. 4, 2012.
INNCOM, "Application Note 219 Volatile Organic Chemical (VOC) Test Setup," Revision 1.00, 10 pages, 2009.

* cited by examiner

CONTROL ASSEMBLY

BACKGROUND

The present disclosure pertains to wall-mounted mechanisms in rooms of virtually all sorts of space, and particularly to mechanisms that facilitate load control in the rooms.

SUMMARY

The disclosure reveals a control assembly for insertion in a certain-sized connection box or space in lieu of another component such as a switch or other electrical component. The replacement may bring in new capabilities plus maintain the capabilities of the removed component. The box need not be removed, or if the box is removed the structure or space encompassing the box need not be enlarged. Further, no new wiring is needed. This replacement or substitution may be particularly applicable to rooms of hotels, motels, restaurants, offices, apartments, and other similar facilities. Neither time nor expense of redoing a structure to hold a larger box or provide more space is needed. In many cases, there is not necessarily adequate space to add components for providing additional capabilities to a room, such as a component having an air quality controlled device for operating a ventilation fan in the room.

DESCRIPTION

Figure 1:
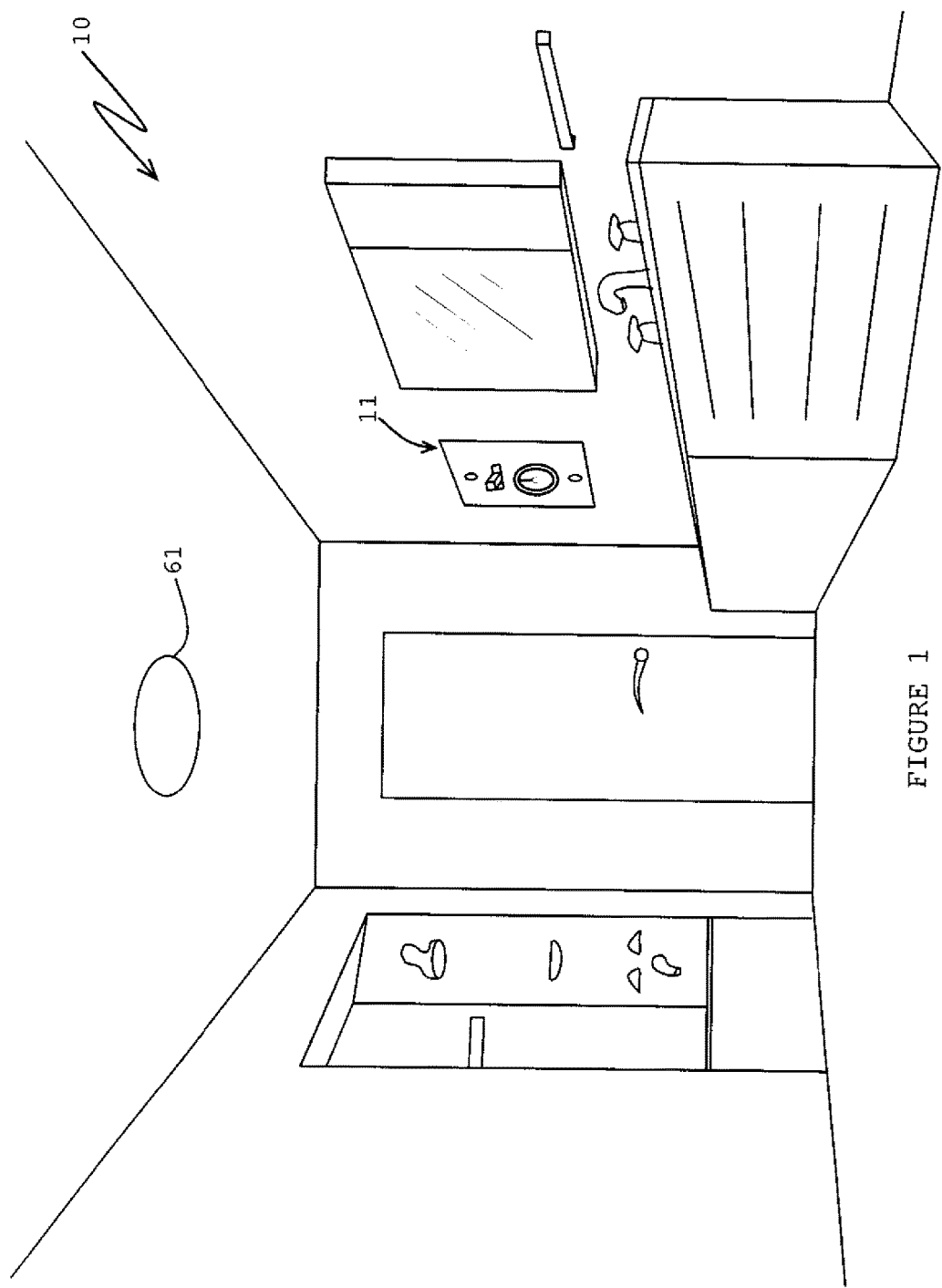
FIG. 1 is a diagram showing an example of available space for a multi-functional item in a room.

Electrical wallbox-mounted switches and timers may be used throughout the residential and commercial building space. They may be single-gang switches and timers. These switches and timers may typically be used to turn on or off ventilation fans. For the reason of having these features reasonably accessible to the user, most of the time, the switches and timers may be mounted on a wall of a room to be ventilated. This mounting may typically need a double gang box at the same location where a switch or timer is mounted that is used to operate a light load external to the device, e.g., a fan, in the room to be ventilated.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the present system and approach.

"Room" noted herein may refer to a unit in a hotel, motel, multiplex residence, multi-party home, private residence, and the like. "Room" here may refer to the unit which incorporates integral rooms. The term "room" as referred to in the present description may actually contain one or more integral rooms such as a bathroom, a sleeping area, a study, a closet, and so forth within the room. "Room" may also refer to a bathroom in a public space, such as a restaurant or office environment. "Room" may also refer to bathrooms in private residences. "Room" may refer to a smoking room in an office building, airport or other places. "Room" may refer to a space on an airplane, train, bus or other transportation entities. "Room" may refer to a shop or a manufacturing area where pollutants are generated by processes used in fabrication of products. "Room" may refer to areas where perishable foods spoil, a space that is being painted with a coating having soluble chemicals, a space where there are human generated odors, particularly toilet-related ones, a space where many VOCs are present, and so on.

In retrofit applications, there may generally be no spare gangs at the wallboxes of guestrooms, bathrooms, kitchens, and the like. Adding a fan control device may typically mean that one has to either change the wallbox or to completely rewire the wallbox. In many retrofit instances, changing the wallbox is not necessarily an option as there is often no space available to mount an additional or larger box. Rewiring might demand expensive labor and sometimes is not necessarily possible because of limitations as to what can be done structurally to the respective room.

Combining the parts of a fan switch or timer with a sensor, an actuating device, controller, transceiver and/or keyboard, may elegantly solve this dilemma and create competitive advantages because of greatly reduced costs of adding, for instance, an indoor air quality sensor and one or more mechanisms to an existing enclosure of a room.

There may be an integration of a relay, a FET or triac to operate a fan load, a keyboard, an indicator, control circuitry, a transceiver, and possibly other components into a control assembly or interface. A user actuated interface may be used to select a status and a power supply to operate this device. Adding a wired or wireless communication capability to signal the status of the indoor air quality and the fan to one or multiple auxiliary locations, such as a central status monitoring system, may be incorporated. The communication capability to allow control and configuration of the fan actuating device from remote locations may be utilized. The communication capability to control other devices in a building automation system by assigning additional functions to the buttons of the device may be utilized.

The present device may feature a fan actuator, a sensor, an RF wireless radio subsystem, and importantly have a replacement of a switch, timer or other existing component in a single gang electrical box without needing further fabrication.

"Single gang" is a term of art in the electrician and construction communities that refers to a standard size connection box for a light switch, an outlet, or other electrical component in a home, commercial building, or other structure.

The descriptive term "present" used herein may refer to the device, assembly, approach system, and the like that is the subject of this description and claims.

One may imagine for example a bathroom entry door situation. When one enters through the door, just to the left or right, there may normally be a single gang wall box that contains a switch and/or a timer that controls, for example, a fan above in the bathroom. With the present device, one may replace the conventional wall switch or timer with the new device that can switch the fan itself based on such things as air quality, and contain elements of a sensor and controller, and communicate through a wireless or wire medium along with other aspects of a building control system.

Without the present solutions, one may have to, at great costs, replace the single gang box with a double gang box (which may include dry wall work and electrician work) and then install more than one of the devices side-by-side (e.g., a networkable fan controller, sensor, switch and often other devices), or alternatively some aspects have to be surface mounted outside the actuator device with wiring or supply power challenges. This state of affairs may be greatly improved and overcome by the present device.

The present device may have one or more switches for selection of "Fan On" and a "Fan Off". A guest may choose either the Fan On or Fan Off functions. The "Fan On", Timer selection and "Fan Off" functions may be activated from any one of a number of control devices. When one of the Fan On, Timer selection or Fan Off switches on the present device is actuated, a small LED inside the switch face may be illuminated, so that the guest knows that function has been activated. Other switch indications may be used.

As to status, Fan On, Timer selection and Fan Off requests may be in some arrangements may automatically be reported to a building automation system for determination use of centralized exhaust duct pressurization. For instance, if there are many small exhaust fans operating, such as those in a bathroom or other space where a removal of air pollutants is desired, a large fan such as that of a central air handling unit (AHU) may operate at a high capacity. Whereas if a few or no small exhaust fans are operating, then the large fan may operate at a low capacity. The information about which small fans are operating may be reported from the respective control devices to the building automation system so that the exhaust duct is appropriately pressurized.

The present control device may be mounted in one of several ways. When installed during construction, a standard, single gang low-voltage junction box may be mounted directly on the wall stud, and the present device may be secured to the wall stud with standard screws, nails, or other fasteners. Or the original component may be replaced with the present device in the same space used by the original component.

Indoor air quality sensors may detect or measure CO2, VOCs (volatile organic chemicals), CO, humidity, smoke, or other air pollutants and forward sensed readings to a controller that takes on a role to manage or report air quality in rooms and buildings. To retrofit such a sensor with its controller in the rooms of existing buildings may involve a significant total amount of cost spent on wiring and installation efforts. It may be beneficial if all these components were housed in a standard wallbox or mountable device in the same space of a pre-existing wallbox, so that the systems could be retrofitted easily and at low cost in existing buildings.

A primary target for the present device or mechanism may be bathrooms, rooms with cooking areas, shops, and so forth that have a controllable wall or ceiling fan or ventilator. In such instances, there may be a switch or a timer that the user can use to manually operate a ceiling fan. The present mechanism may replace the switch or timer with a device that contains a load actuator to control the fan, an IAQ sensor to sense the quality of the air in a room or space, a microcontroller to manage virtually all of the functions of the device, an optional wireless or wired transponder to report status and receive control and setup data from a building automation system and an optional user interface for manual control (i.e., override) of the fan. Since all of the elements may be part of a single device that has a standard form factor for a wallbox, the retrofit solution may very simply be achieved by replacing contents of the wallbox such as an existing component with a new integrated device that can control the air quality in the room or space based on its internal air quality sensor.

Figure 8:
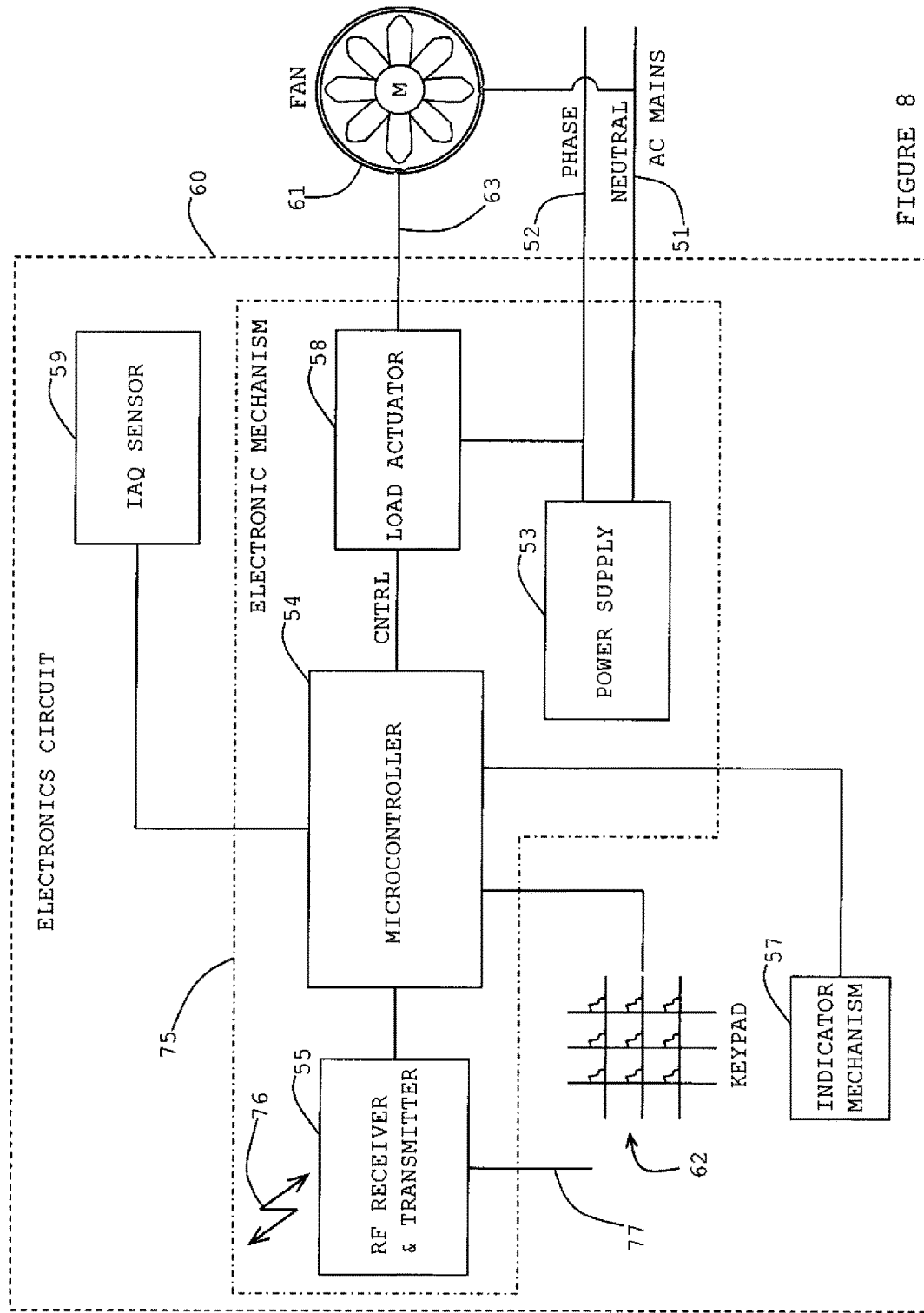
FIG. 8 is a diagram of a schematic showing an example electronics circuit for a control assembly.

FIG. 8 is a block diagram of the hardware setup that is described further herein. The present device may be very much suited to replace existing manual fan speed mechanisms in enclosed spaces, and in particular, bathrooms and cooking areas of venues such as hotel rooms, restaurants, offices, airport terminals, apartments, and so forth, where operating an exhaust fan for 24 hours every day would be considered wasteful. A low installation cost and a lower cost of having all elements integrated into a single device may result in significant competitive advantages over solutions that are based on discrete components that have a separate air quality sensor, a controller with load actuation capability and a user interface for manual control, that are located apart from one another.

The present device may be such that a person using a bathroom with the device installed need not turn on the fan since the fan can automatically turn on if an odor in the bathroom increases beyond a particular level. An odor may be a significant perfume or deodorant smell.

Software in the present device may allow for a flexible sequence of operation. For example, a user may manually turn the fan ON or OFF. But an IAQ sensor value to a processor or controller having the software, may determine what the fan speeds are in the ON and OFF modes. For example, if the VOC level is very low, then the fan may be stopped in the OFF position, and the fan may run at a moderately low level in the ON mode. In contrast, if the VOC level is high, the fan may run at a low speed in the OFF mode (so that the noise level is sufficiently low in that the occupant does not perceive an operation of the fan as disturbing), and the fan may operate at a vigorously high speed when the fan is in the ON mode. With a triac used in lieu of a relay in some instances of the present device, speed of the fan may be virtually totally variable.

The present device may also receive, via a communication channel, further signals, such as those indicating whether a room or space is occupied by a person, or whether the space is rented or otherwise accessible to customers. Information about the space may further enable the present device to operate the fan at more appropriate fan speeds to conserve energy and to maintain lower noise levels. The device may further receive control information from a central building management system to manage the fan speed according to control strategies external to the space. The air quality sensor may detect one or a multiple of VOCs, humidity, temperature, and/or other air properties in the space. The air quality sensor may provide a value of an air quality index of the air in a room or space. The value of the air quality index may indicate an occupancy state of a room. A particular number or density of, for example, VOCs in a room or space of a particular volume may indicate a certain likelihood of a presence or absence of a number of humans in the room or space.

As to a box or structure for containing or holding the present device, no. 8 mounting screws may be vertically placed about 3.28 inches apart if the mounting is a typical standard single gang junction box. A minimum box depth of about 1.25 inches may be needed. The device may have, for instance, example dimensions of about 3.9"H×1.7"W× 1.2"D. The dimensions may be other ones as long as the device fits in the single gang junction box or other desired and/or already pre-installed box. The dimensions may different for another kind of box. The present device and its wallbox may also have other specifications.

The present device, system and approach, as described herein and/or shown in the Figures, may incorporate one or more processors, computers, controllers, user interfaces, wireless and/or wire connections, and/or the like.

FIG. 1 is a diagram showing an example of available place for a multi-functional item such as a new control assembly in a guest room 10. The control assembly may replace such things as a fan switch and/or timer in an assembly 11 situated in a wall of room 10, such as for example a bathroom.

Figure 2:
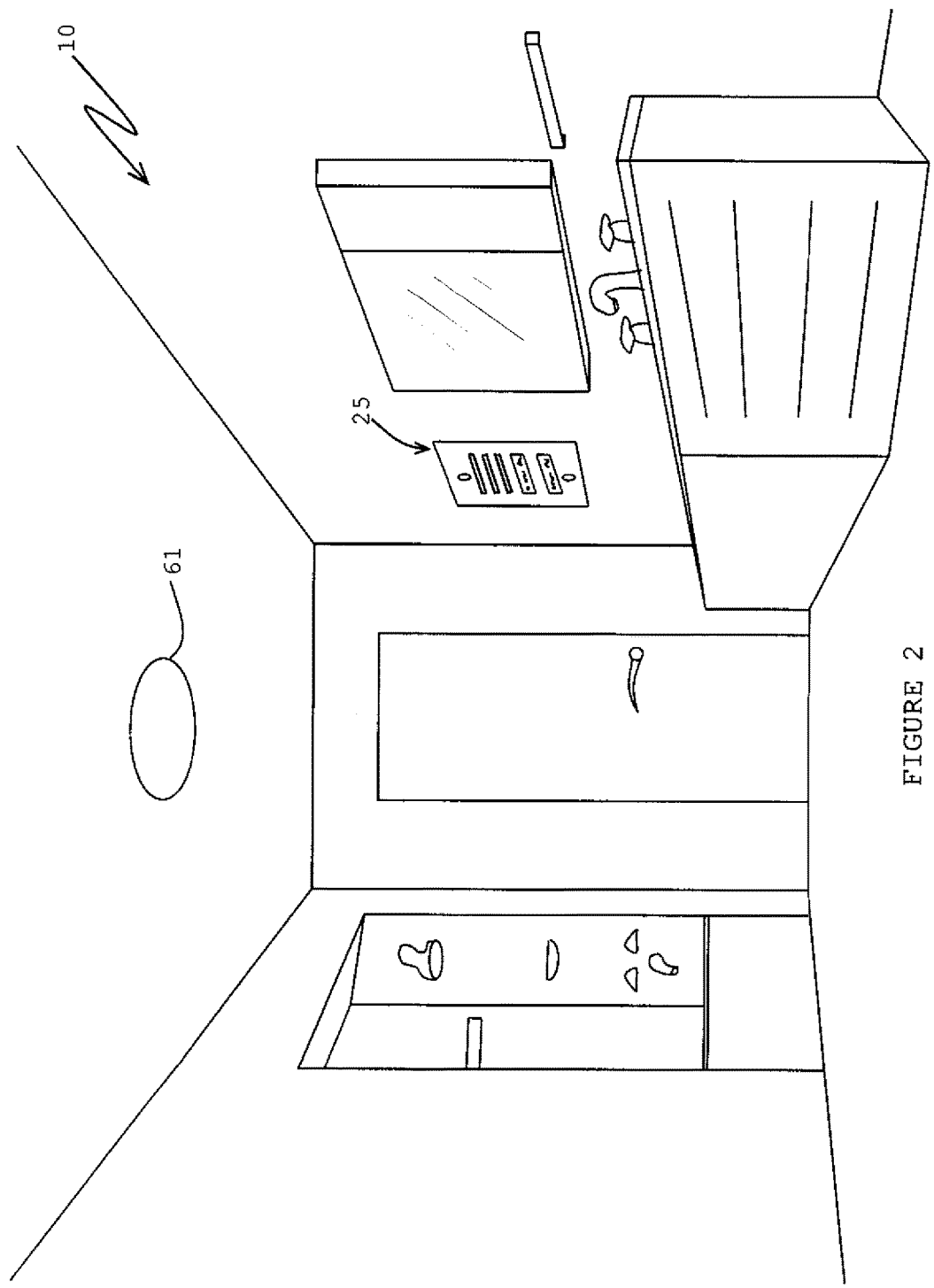
FIG. 2 is a diagram of the multi-functional item as replacement for another component the room wall.
Figure 3:
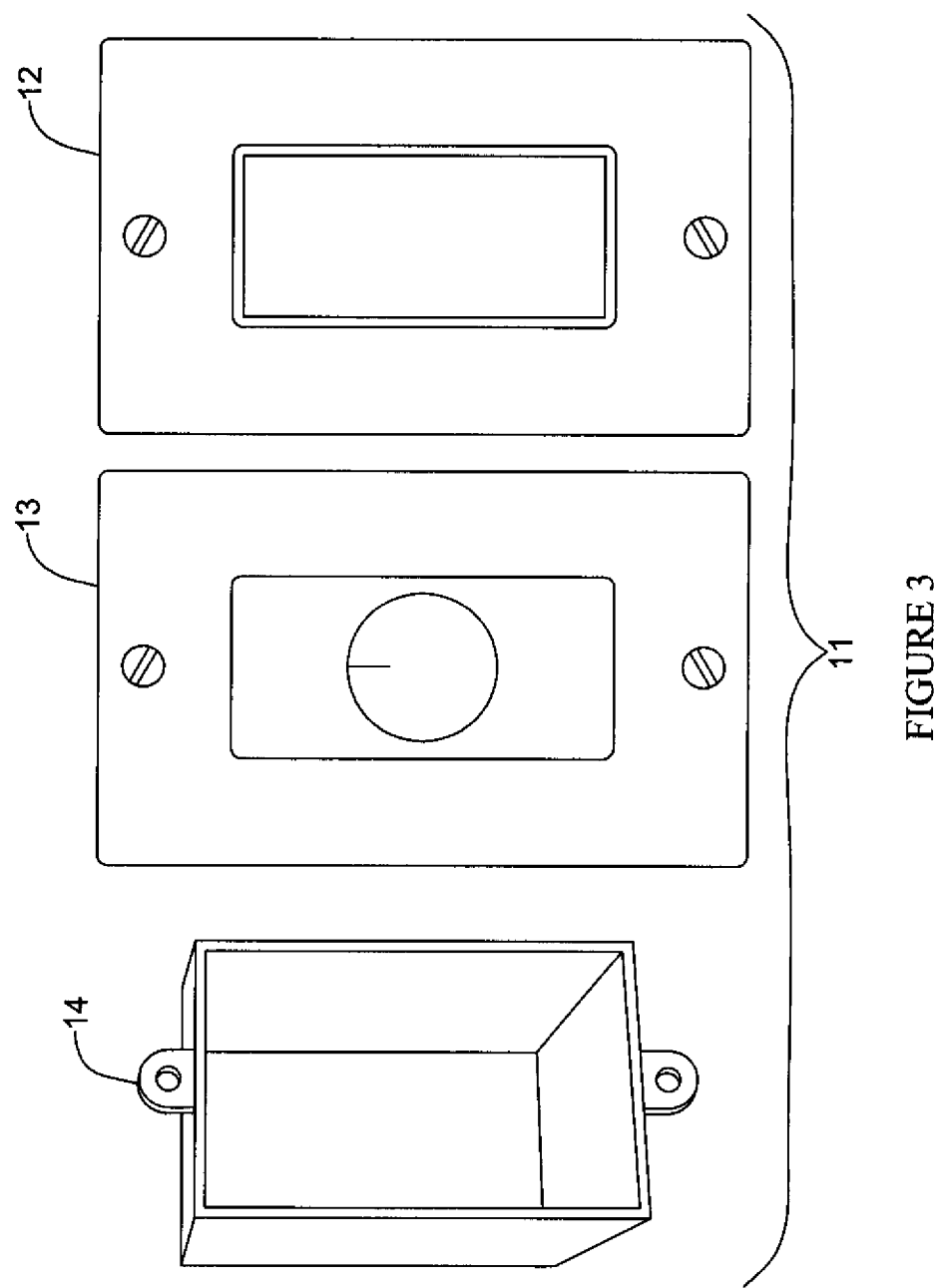
FIG. 3 is a diagram of a switch and/or timer which may be removed from an electrical connection box.

FIG. 2 is a diagram of a replacement item 25 on the wall of room 10. FIG. 3 is a diagram of a switch and/or timer with a plate 13 and a switch with plate 12 which may be removed from a single gang electrical connection box 14 and replaced with item 25 (FIG. 2) that may be connected to the wires in box 14 and inserted into box 14. Item 25 may be, for example, regarded as a control assembly 25 incorporating an integration of a relay, FET or triac to operate a fan load, a keyboard, an air quality sensor, an indicator, control circuitry, a transceiver, and possibly other components.

Figure 4:
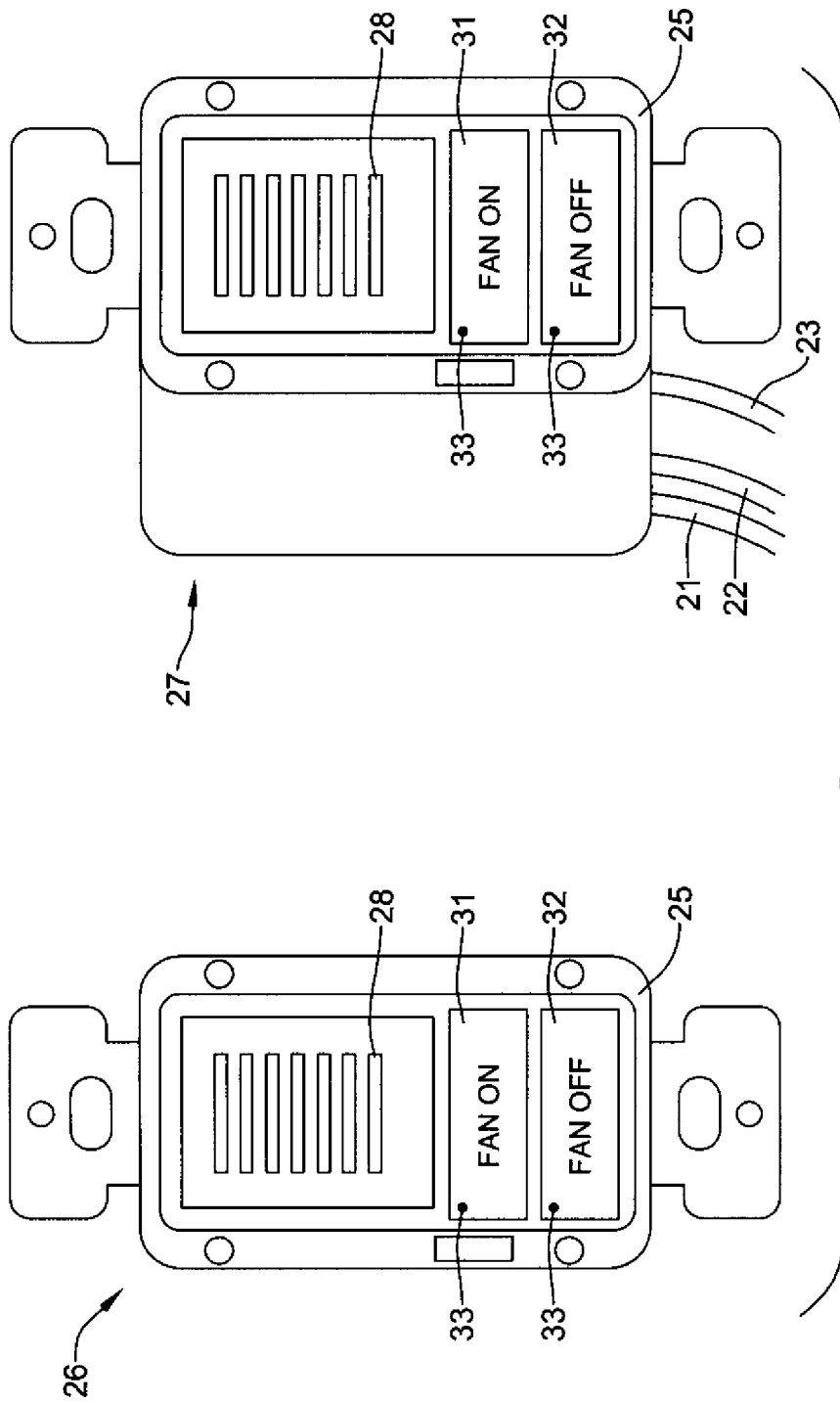
FIGS. 4, 5, 6 and 7 are diagrams of example control assemblies that may be inserted in place of an electrical component space or box.

FIG. 4 illustrates a control assembly 25 for insertion in connection box 14 of FIG. 3. Diagram 26 is a front view of control assembly 25. Diagram 27 is a perspective view of control assembly 25. Slots 28 may be for receiving air for quality sensing. Switches 31 and 32 may indicate "Fan On" and "Fan Off" for controlling a fan load. There may be a timer mechanism added to the front of assembly 25. There may be one or more switches for requesting other actions such as restraint or stoppage of certain activities. Each switch may have an LED light 33 which indicates an activation of a request made by pressing the respective switch or button 31 or 32. Three wires 21, 22 and 23 such as a phase, neutral and load wires, respectively, may be connected to control assembly 25. In some cases or areas of location, there may be a ground or earth wire connected to assembly 25.

Switch 31 may be a selection of a Fan On switch or a two-position On/Off switch. Switch 31 may instead be a rocker switch with a middle neutral position or off position. Switch 31 may be labeled as "Fan On" or other applicable terminology. Switch 31 may be spring loaded in that if one presses the switch, it makes a momentary contact to activate the "Fan On" indication to an operator, housekeeping, front desk staff, a central building automation system, and others as applicable. Switch 31 may be like a spring-loaded button switch.

Switch 32 may be a selection Fan Off switch or a two-position On/Off switch. Switch 32 may instead be a rocker switch with a middle neutral or off position. Switch 32 may be labeled as "Fan Off" or other applicable terminology. Switch 32 may be spring loaded in that if one presses the switch, it makes a momentary contact to activate the "Fan Off" indication to an operator, housekeeping, front desk staff, a central building automation system, and others as applicable.

Figure 5:
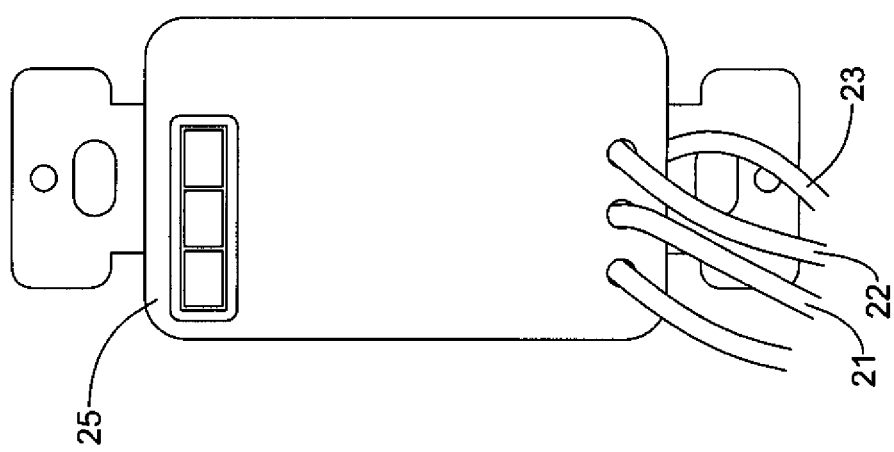

Assembly 25 may have additional switches for various other functions, such as adjusting, for example, a thermostat temperature, fan speed, timing or other factors. Switch 31, switch 32 and other possibly added switches implemented in control assembly 25, may be selected from an assortment of various types of switches not necessarily mentioned herein. FIG. 5 is a backside view of assembly 25.

Figure 6:
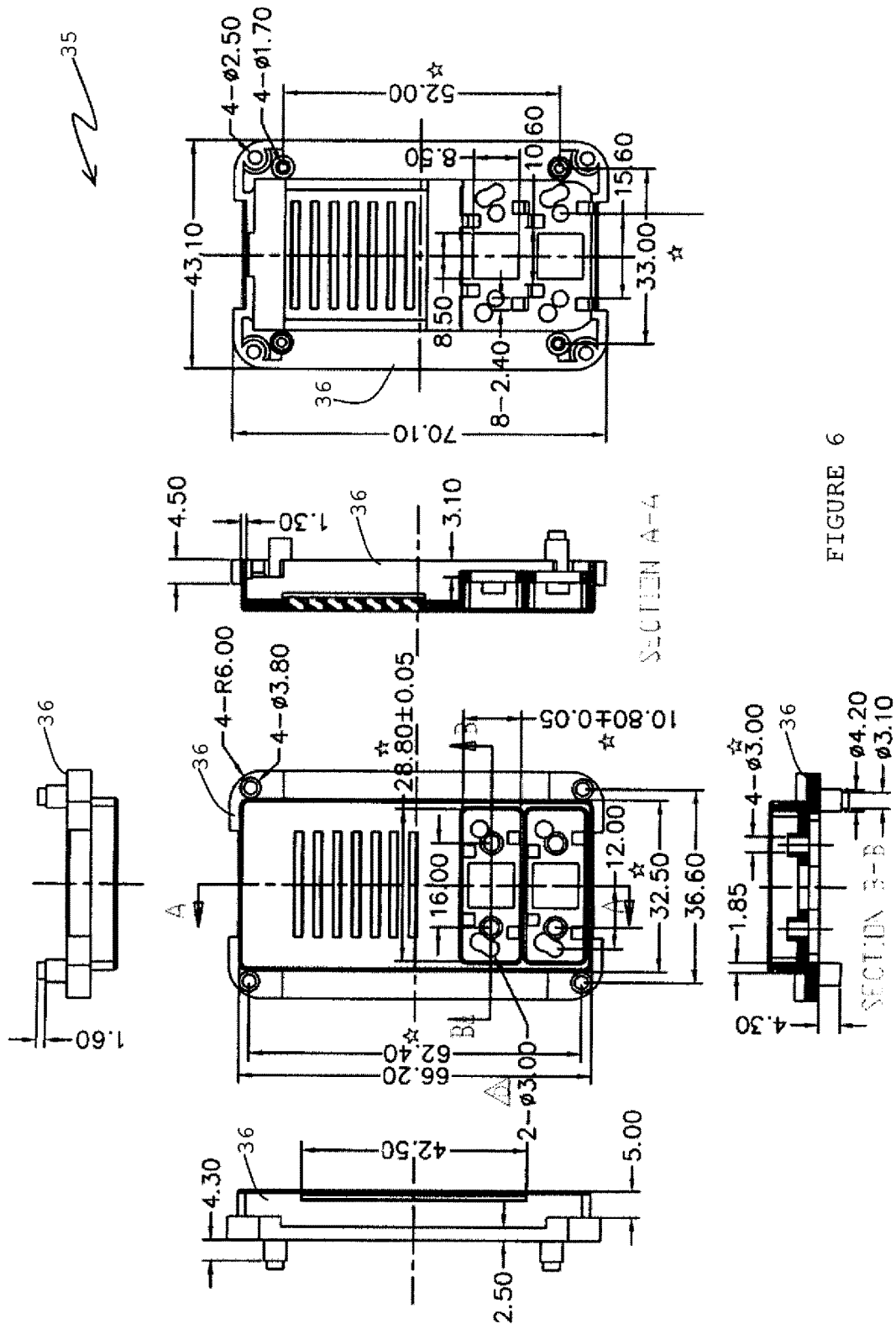
Figure 7:
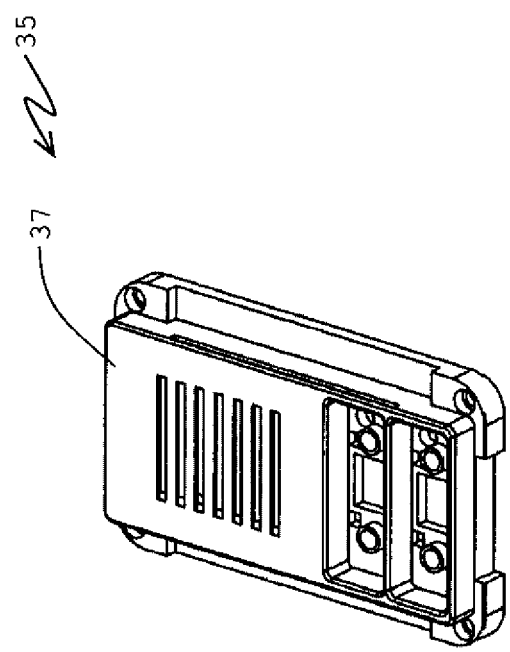

FIG. 6 is a diagram of a set of views of a housing 35 of an example version of control assembly 25 used in lieu of an electrical component in a connection box such as box 14 in FIG. 1. Side, end, front and back views 36 are shown. Not all components of control assembly 25 are necessarily shown in FIG. 6. FIG. 7 is a diagram showing a perspective view 37 of housing 35.

FIG. 8 is a schematic of an example electronics circuit 60 of a control assembly 25 for an existing connection box 14 previously having had a different electrical component 13 such as a switch for a load 61 like a fan. Assembly 25 may have its own housing that may replace connection box 14 without altering the space for connection box 14. Other circuit designs may be used for electronics circuit 60. When the electrical component 12 or 13 such as a switch or timer, respectively, as in FIG. 3, is removed from connection box 14, a replacement item, such as control assembly 25, may have electronics, for example, like that of circuit 60.

Control assembly 25 with its electronics circuit 60 may turn on an air quality improvement mechanism, such as fan 61, when air quality sensor indicates an air quality index value lower than a first predetermined value. Control assembly 25 may turn off the air quality improvement mechanism 61 when the air quality index value is higher than a second predetermined value. The second predetermined value may be greater than the first predetermined value. An increasing air quality index value may indicate an improving quality of air, that is, the air has a decreasing amount of pollutants.

Several wires may exist in box 14 after the previous component 12 or 13 is removed. The wires may be a neutral line (e.g., ground), a phase line 52 (e.g., 112 VAC) and a load wire 63. Lines 51 and 52 may go to a power supply 53 for converting a line voltage to different magnitudes of voltage for powering various portions of circuit 60 such as micro controller 54, RF receiver and transmitter (e.g., a transponder) 55, indicator mechanism 57, load actuator 58, sensor 59, keypad 62, and so forth. Line 52 may also be connected to a load actuator 58 which can be an electrically operated switch, such as a triac, FET, relay and so forth, for controlling power via wire 63 to load 61, which may be a fan, or some other device or appliance.

An indoor air quality sensor 59 may provide signals to microcontroller 54. Load actuator 58 may be, for example, an electrical replacement of the component 12 or 13 removed from box 14 such as a switch, timer or other item, although actuator 58 may operate in response to signals from microcontroller 54. Actuator 58 may be connected to electrical load 61 which is a fan generally, for example in room 10 (FIG. 2), controlled by control assembly 25.

Microcontroller 54 may be connected to load actuator 58 and to an RF receiver and transmitter 55. A keypad 62, having such things as switches 31 and 32 (FIG. 4), may be connected to microcontroller 54. Inputs to keypad 62 may provide signals for controlling load actuator 58, receiver and transmitter 55, and input from air quality sensor 59. Various requests, such as fan on and off times, fan speeds, and information may be input at keypad 62 for microcontroller 54 as appropriately provided signals to be transmitted from transmitter 55 to various places like a front desk, manager, a central building automation system in a multi-room building, or other facility. In some situations, keypad 62 may be used to program microcontroller 54. Such programming may, for example, set thresholds for signals from sensor 59 to turn on or off fan 61, set fan speeds, and more. Signals via the wireless transponder 55 may be provided to microcontroller 54 in lieu of signals from keypad 62, for example, as signals to load actuator 58.

An electronic mechanism 75 within electronics circuit 60 may incorporate a power supply 53, microcontroller 54, RF receiver and transmitter 55, and load actuator 58. RF receiver and transmitter 55 may interact with signals to and from other entities with RF 76 or wire 77. Keypad 62 having one or more switches and indicator mechanism 57 having one or more indicators may be connected to electronic mechanism 75. Sensor 59 may be connected to electronic mechanism 75.

To recap, a system for a control assembly may incorporate an electrical load situated in a room, a standard electrical box or standard electrical box space, situated in a wall of the room, for containing an ordinary electrical component for controlling electrical power to the electrical load, and a control assembly that fits in the standard electrical box or standard electrical box space in lieu of the ordinary electrical component. The electrical load may have electrical connections to the standard electrical box or standard electrical box space in the room. The electrical load may incorporate an air quality improvement mechanism.

An ordinary electrical component may be an available or pre-existing component.

The control assembly may be connectable with electrical connections to the standard electrical box or standard electrical box space in the room. The control assembly may incorporate an air quality sensor, and an electronic mechanism, for controlling the electrical load, connected to the air quality sensor.

The control assembly may turn on the air quality improvement mechanism when the air quality sensor indicates an air quality index value lower than a first predetermined value. The control assembly may turn off the air quality improvement mechanism when the air quality sensor indicates an air quality index value higher than a second predetermined value. The second predetermined value may be greater than the first predetermined value. Air having an increasing air quality index value may be air having a decreasing amount of pollutants.

The air quality sensor may provide a value of an air quality index of a room. The value of the air quality index may indicate an occupancy state of a room.

A room may refer to a unit in a hotel, motel, multiplex residence, multi-party home, a single residence, private or commercial building space, or the like, or an integral room with in the unit.

The standard electrical box may be a single gang electrical box.

The air quality improvement mechanism may incorporate a fan for ventilating the room.

The electronic mechanism may incorporate a microcontroller connected to the air quality sensor, a transmitter and/or receiver connected to the microcontroller, and a load actuator connected to the microcontroller. The load actuator may be for connection to the electrical load.

If the electronic mechanism is activated with a switch for effecting a certain action, then an indicator associated with the switch may indicate that the action has been effected. If an action is effected with a switch, then the action may be reported to a central building automation system.

A signal for reporting an action to the central building automation system may be communicated via a transmitter of the electronic mechanism to a receiver that receives the signal via a wire and/or wireless medium to the central building automation system.

An approach, for installing a control component in a room, may incorporate installing a control component in an existing electrical box or a space for an electrical box in a room of a hotel, motel, residence, or other facility. The control component may incorporate an air quality sensor that indicates an amount of air pollutants in the room, and a load actuator, for turning on or off a load in the room, connected to the air quality sensor. The load may be turned on or off according to an output of the air quality sensor. The load may incorporate a fan for ventilating the room to reduce the amount of air pollutants in the room.

The electrical box may be a single gang electrical box. An existing electrical box may be designed for a holding a commonly available switch and/or timer as the load.

The control component may further incorporate a microcontroller connected to the load actuator and the air quality sensor, and a wireless transponder connected to the microcontroller for receiving signals to provide control of the load and/or for sending signals from the control component to provide indications of air quality in the room.

The air quality sensor may provide a value of an air quality index of a room. The value of the air quality index may indicate an occupancy state of a room.

An electrical assembly for a room may incorporate a control component for insertion in a single gang electrical box or single gang electrical box space of a room. The control component may incorporate a controller, an air quality sensor connected to the controller, and a load actuator connected to the controller. The load actuator may be for connection to an air quality improvement device in the room.

The control component may replace an electrical component of the single gang electrical box.

The load actuator may provide a power output for turning on the air quality improvement device when an output from the air quality sensor indicates a quality of air in the room as being below a first predetermined value. The load actuator may remove the power output for turning off the air quality improvement device when the output from the air quality sensor indicates the quality of air in the room as being above a second predetermined value. The air quality improvement device may incorporate a fan.

U.S. Pat. No. 7,053,757, issued May 30, 2006, and entitled "Intelligent Door Plate and Chime", is hereby incorporated by reference. U.S. patent application Ser. No. 13/603,328, filed Sep. 4, 2012, and entitled "An Interface Assembly", is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system for a control assembly, comprising:
an electrical load situated in a room;
a standard electrical box or standard electrical box space, situated in a wall of the room, for containing an ordinary electrical component for controlling electrical power to the electrical load; and
a control assembly that fits in the standard electrical box or standard electrical box space in lieu of the ordinary electrical component; and
wherein:
the electrical load has electrical connections to the standard electrical box or standard electrical box space in the room;

the electrical load comprises an air quality improvement mechanism situated in the room and configured to remove air pollutants from the room, the air quality improvement mechanism having an off mode and an on mode;

the control assembly is connected to the electrical connections to the standard electrical box or standard electrical box space in the room; and the control assembly comprises:

an air quality sensor in the room and configured to detect the air pollutants in the room on which a value of an air quality index is based; and an electronic mechanism, for controlling the electrical load, connected to the air quality sensor; and wherein when the air quality improvement mechanism is in the on mode, the control assembly is configured to turn the air quality improvement mechanism to a first operating level to remove the air pollutants from the room when the air quality sensor indicates a first value of the air quality index is lower than a predetermined value; and wherein when the air quality improvement mechanism is in the off mode, the control assembly is configured to:

turn the air quality improvement mechanism to a second operating level lower than the first operating level to remove the air pollutants from the room when the air quality sensor indicates the value of the air quality index is the first values and turn the air quality improvement mechanism to an off operating level when the air quality sensor indicates a second value of the air quality index is higher than the predetermined value.

2. The system of claim 1, wherein:

the air quality sensor provides the value of the air quality index of a room; and the value of the air quality index indicates an occupancy state of a room.

3. The system of claim 1, wherein the room refers to a unit in a hotel, motel, multiplex residence, multi-party home, a single residence, private or commercial building space, or an integral room with in the unit.

4. The system of claim 1, wherein the standard electrical box is a single gang electrical box.

5. The system of claim 1, wherein the air quality improvement mechanism comprises a fan in the room for ventilating the room.

6. The system of claim 1, wherein the electronic mechanism comprises:

a microcontroller connected to the air quality sensor;

a transmitter and/or receiver connected to the microcontroller; and a load actuator connected to the microcontroller; and wherein the load actuator is for connection to the electrical load.

7. The system of claim 1, wherein when the air quality improvement mechanism is in the high power mode, the control assembly is configured to turn the air quality improvement mechanism to a third operating level to remove the air pollutants from the room when the air quality sensor indicates a second value of the air quality index is higher than the predetermined value, the third operating level is lower than the first operating level.

8. The system of claim 1, wherein if the electronic mechanism is activated with a switch for effecting a certain action, then an indicator associated with the switch indicates that the action has been effected.

9. The system of claim 8, wherein if an action is effected with a switch, then the action is reported to a central building automation system that is remote from the room and in communication with a plurality of control assemblies that are each associated with a room.

10. The system of claim 9, wherein a signal for reporting an action to the central building automation system is communicated via a transmitter of the electronic mechanism to a receiver that receives the signal via a wire and/or wireless medium to the central building automation system.

11. An electrical assembly for a room, comprising:

a control component for insertion in a single gang electrical box or single gang electrical box space of a room; and an air quality improvement device including a variable speed fan in the room, the variable speed fan having a plurality of fan speed levels in addition to an off fan speed level;

wherein the control component comprises:

a controller;

an air quality sensor connected to the controller, wherein the air quality sensor is configured to sense air pollutants and output sensor values to the controller; and a load actuator connected to the controller; and wherein the load actuator is in communication with the fan in the room; and wherein the controller adjusts a power output from the load actuator to the variable speed fan to adjust a fan speed level to one of the plurality of fan speed levels based on outputted sensor values from the air quality sensor;

a switch having an off position to turn the variable speed fan in the room to an off mode and an on position to turn the variable speed fan in the room to an on mode; and wherein the controller adjusts a power output from the load actuator to the variable speed fan to adjust the fan speed level to a different one of the plurality of fan speed levels for the same outputted sensor values from the air quality sensor based on whether the switch is in the off position or is in the on position.

12. The assembly of claim 11, wherein the control component can replace an electrical component of the single gang electrical box.

13. The assembly of claim 11, wherein when the switch is in the off position:

the load actuator provides a power output for turning on the air quality improvement device when an output from the air quality sensor indicates a quality of air in the room as being below a first predetermined value; and the load actuator removes the power output for turning off the air quality improvement device when the output from the air quality sensor indicates the quality of air in the room as being above a second predetermined value.

* * * * *